(12) United States Patent
Liu et al.

(10) Patent No.: US 10,564,950 B1
(45) Date of Patent: Feb. 18, 2020

(54) DISASSEMBLY CODE GENERATION DURING DEBUGGING

(71) Applicant: INTERNATIONAL BUSINESS MACHINES CORPORATION, Armonk, NY (US)

(72) Inventors: Tie Liu, Beijing (CN); Heng Wang, Beijing (CN); Qi Liang, Shanghai (CN); Xiao Ling Chen, Beijing (CN); Xue Yong Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/128,608

(22) Filed: Sep. 12, 2018

(51) Int. Cl.
*G06F 8/53* (2018.01)
*G06F 11/36* (2006.01)

(52) U.S. Cl.
CPC ............. *G06F 8/53* (2013.01); *G06F 11/362* (2013.01)

(58) Field of Classification Search
CPC ................................. G06F 8/53; G06F 11/362
USPC .................................................. 717/124–135
See application file for complete search history.

(56) References Cited

U.S. PATENT DOCUMENTS

| | | | |
|---|---|---|---|
| 6,941,492 B1 | 9/2005 | Ezra et al. | |
| 9,117,019 B2 | 8/2015 | Wintergerst et al. | |
| 9,632,913 B2 | 4/2017 | Deakin et al. | |
| 2002/0010907 A1* | 1/2002 | MacCormack | G06F 8/53 717/106 |
| 2003/0065976 A1* | 4/2003 | Bennett | G06F 8/53 714/35 |
| 2007/0168994 A1 | 7/2007 | Barsness et al. | |
| 2009/0235054 A1* | 9/2009 | Pan | G06F 8/53 712/208 |
| 2010/0306746 A1* | 12/2010 | Barua | G06F 8/52 717/136 |
| 2014/0317602 A1 | 10/2014 | Zuo | |
| 2015/0033078 A1 | 1/2015 | Wintergerst et al. | |
| 2015/0135313 A1* | 5/2015 | Wesie | G06F 9/445 726/22 |
| 2015/0143452 A1* | 5/2015 | Hamlen | G06F 21/51 726/1 |
| 2017/0116108 A1* | 4/2017 | Miskelly | G06F 11/3624 |
| 2017/0371635 A1* | 12/2017 | Davidson | G06F 8/52 |
| 2018/0196734 A1* | 7/2018 | Chen | G06F 11/3664 |

OTHER PUBLICATIONS

Liu et al., "Binary Code Analysis," IEEE, 2013, p. 60-68. (Year: 2013).*

(Continued)

*Primary Examiner* — Qing Chen
(74) *Attorney, Agent, or Firm* — Teddi E. Maranzano

(57) ABSTRACT

Embodiments of the present invention provide a method, a system, and a computer program product for disassembly code generation during debugging. In the method, a first disassembly code is obtained based on a source code of a computer program. Runtime information of the computer program is obtained from a debugging engine. And a second disassembly code is generated based on the first disassembly code and the runtime information. Computing works about generating disassembly code are distributed in different phases. When the user requests a view of the disassembly code, the response time will be reduced.

17 Claims, 10 Drawing Sheets

(56) References Cited

OTHER PUBLICATIONS

Mell et al., "The NIST Definition of Cloud Computing", Recommendations of the National Institute of Standards and Technology, Special Publication 800-145, Sep. 2011, 7 pages.
Xu, "Remote Debug Windows Azure Cloud Service", Accessed on Sep. 7, 2018, http://geekswithblogs.net/shaunxu/archive/2013/11/02/remote-debug-windows-azure-cloud-service.aspx, pp. 1-4.

* cited by examiner

704

```
A second disassembly code
……
0x0000000000400526 <+0>: <function_1>
0x0000000000400526 <+0>: push %rbp
```

```
0x0000000000400527 <+1>: mov %rsp,%rbp
0x000000000040052a <+4>: mov 0x200b0c(%rip),%eax
0x0000000000400530 <+10>: add $0x64,%eax
0x0000000000400533 <+13>: mov %eax,0x200b03(%rip)
0x0000000000400539 <+19>: mov 0x200afd(%rip),%eax
0x000000000040053f <+25>: mov %eax,%esi
0x0000000000400541 <+27>: mov $0x4005e4,%edi
0x0000000000400546 <+32>: mov $0x0,%eax
0x000000000040054b <+37>: callq 0x400400
0x0000000000400550 <+42>: mov $0x0,%eax
0x0000000000400555 <+47>: pop %rbp
0x0000000000400556 <+48>: retq
……
```

901

```
A call stack

#0 0x0000000000400526  <function_1>
#1 0x000000000040327C <function_2>
……
```

DISASSEMBLY CODE GENERATION DURING DEBUGGING

BACKGROUND

The present invention relates to computer program debugging, and more specifically, to a disassembly code generation during debugging.

During computer program debugging, a user may need to view a disassembly code to better know the state of the computer memory. The user then can discover more underlying information or errors.

SUMMARY

According to a first embodiment of the present invention, there is provided a computer-implemented method for disassembly code generation during debugging. In the method, a first disassembly code is obtained based on a source code of a computer program. Runtime information of the computer program is obtained from a debugging engine. And a second disassembly code is generated based on the first disassembly code and the runtime information.

According to a second embodiment of the present invention, there is provided a system for disassembly code generation during debugging. The system includes: one or more processors, and a memory coupled to at least one of the processors. A set of computer program instructions is stored in the memory and executed by at least one of the processors in order to perform actions. A first disassembly code is obtained based on a source code of a computer program. Runtime information of the computer program is obtained from a debugging engine. And a second disassembly code is generated based on the first disassembly code and the runtime information.

According to a third embodiment of the present invention, there is provided a computer program product for disassembly code generation during debugging. The computer program product includes a computer readable storage medium having program instructions embodied therewith. The computer readable storage medium is not a transitory signal per se. The program instructions are executable to perform a method. In the method, a first disassembly code is obtained based on a source code of a computer program. Runtime information of the computer program is obtained from a debugging engine. And a second disassembly code is generated based on the first disassembly code and the runtime information.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
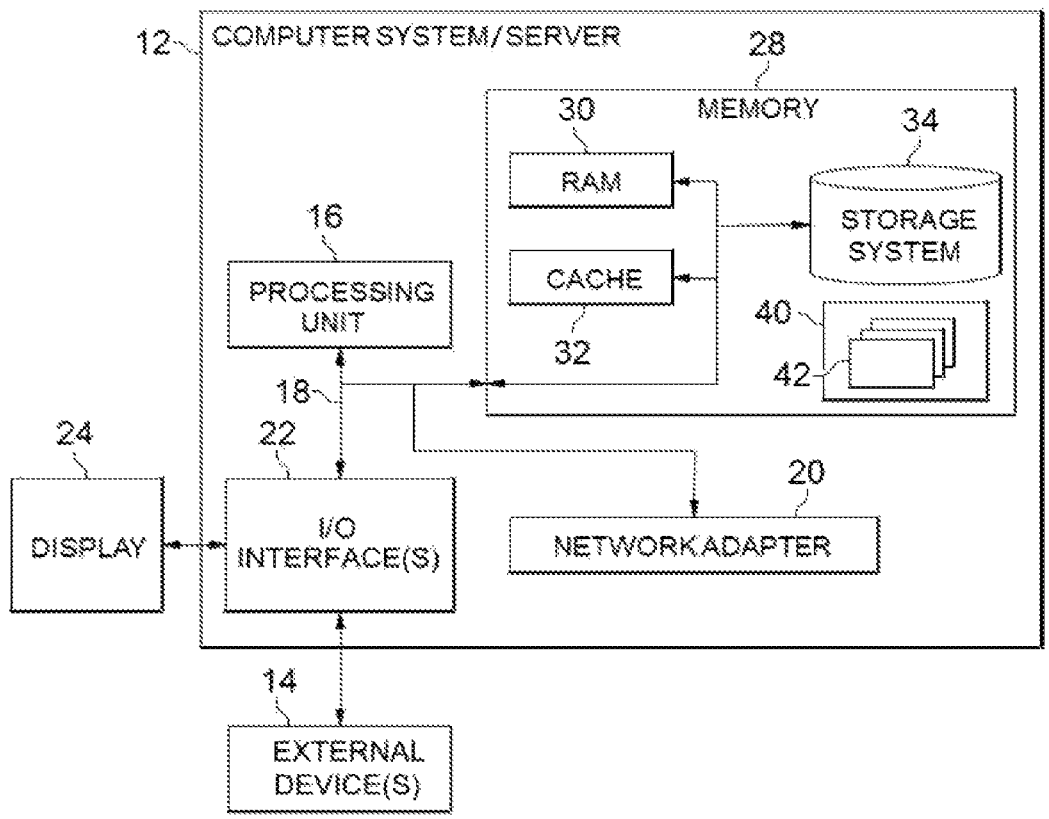
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 is a cloud computing node 10. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
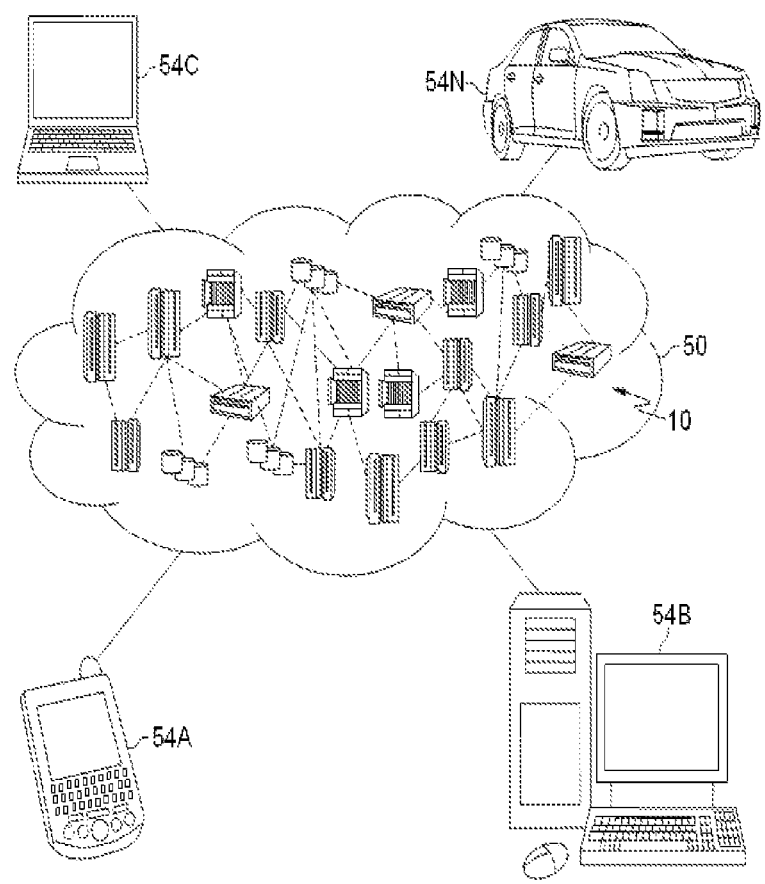
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
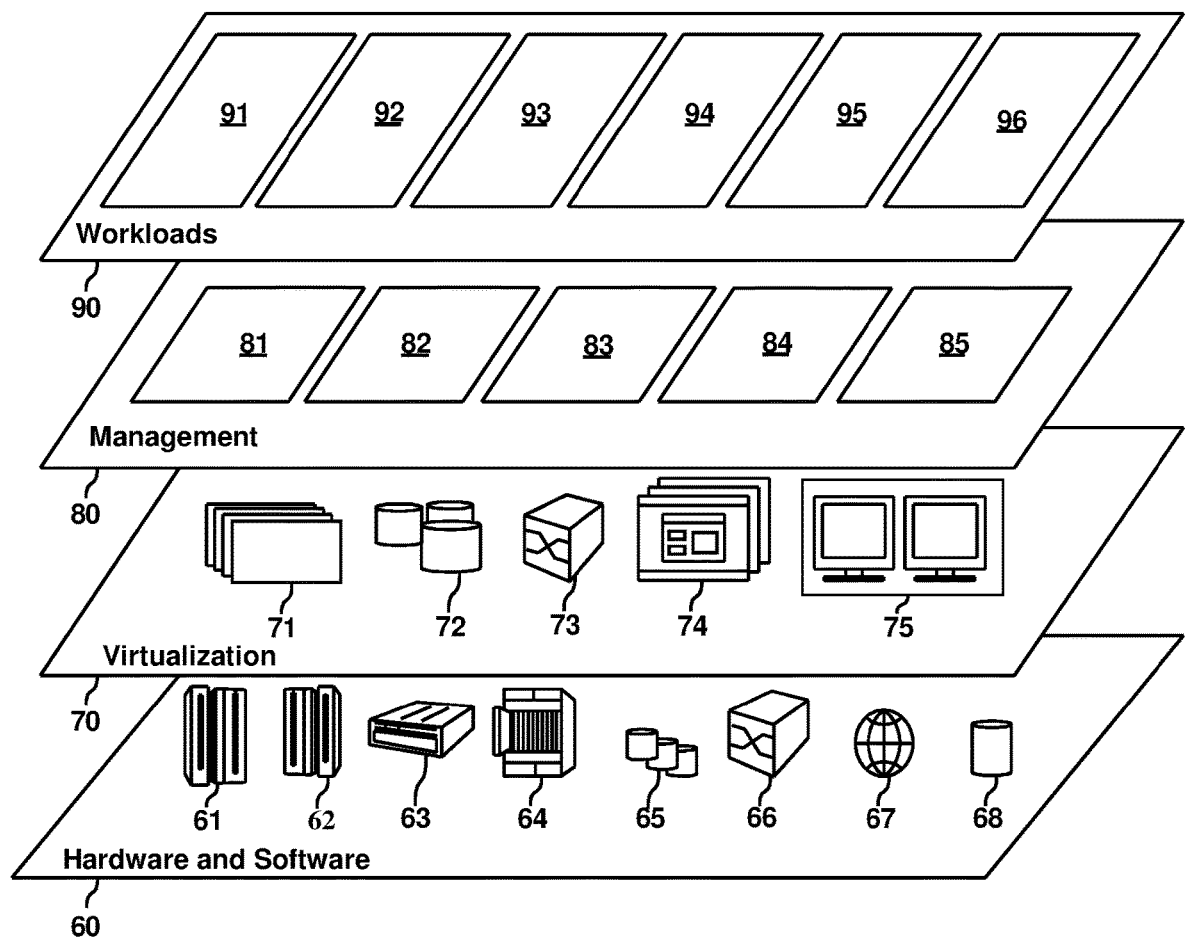
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

The software development and lifecycle management 92 may provide the function of generating a disassembly code of a computer program during debugging. When a user request to view a disassembly code during debugging, the debugging environment may break the running computer program, fetch the machine code already loaded in the computer memory, then translate the machine code to the disassembly code. However, such process consumes time and calculation resources, especially when the computer program is huge and complicated. Therefore, when requesting to view the disassembly code, the user may perceive a time delay, or even cannot get the response from the debugging environment.

Further, in a system such as a cloud environment as shown in FIGS. 2 and 3, the interface of the debugging environment operated by the user and the debugged computer program may be running in different computer nodes, which are physically or logically separated. When the user requests the disassembly code, a large amount of data may be fetched from the memory of the computer node, on which the computer program is running. Then, the fetched data may be transmitted via a network. The network traffic may be suddenly blocked, due to the large amount of data transmission. The debugging environment may not respond to the user for a long time, or even crash.

Figure 10:
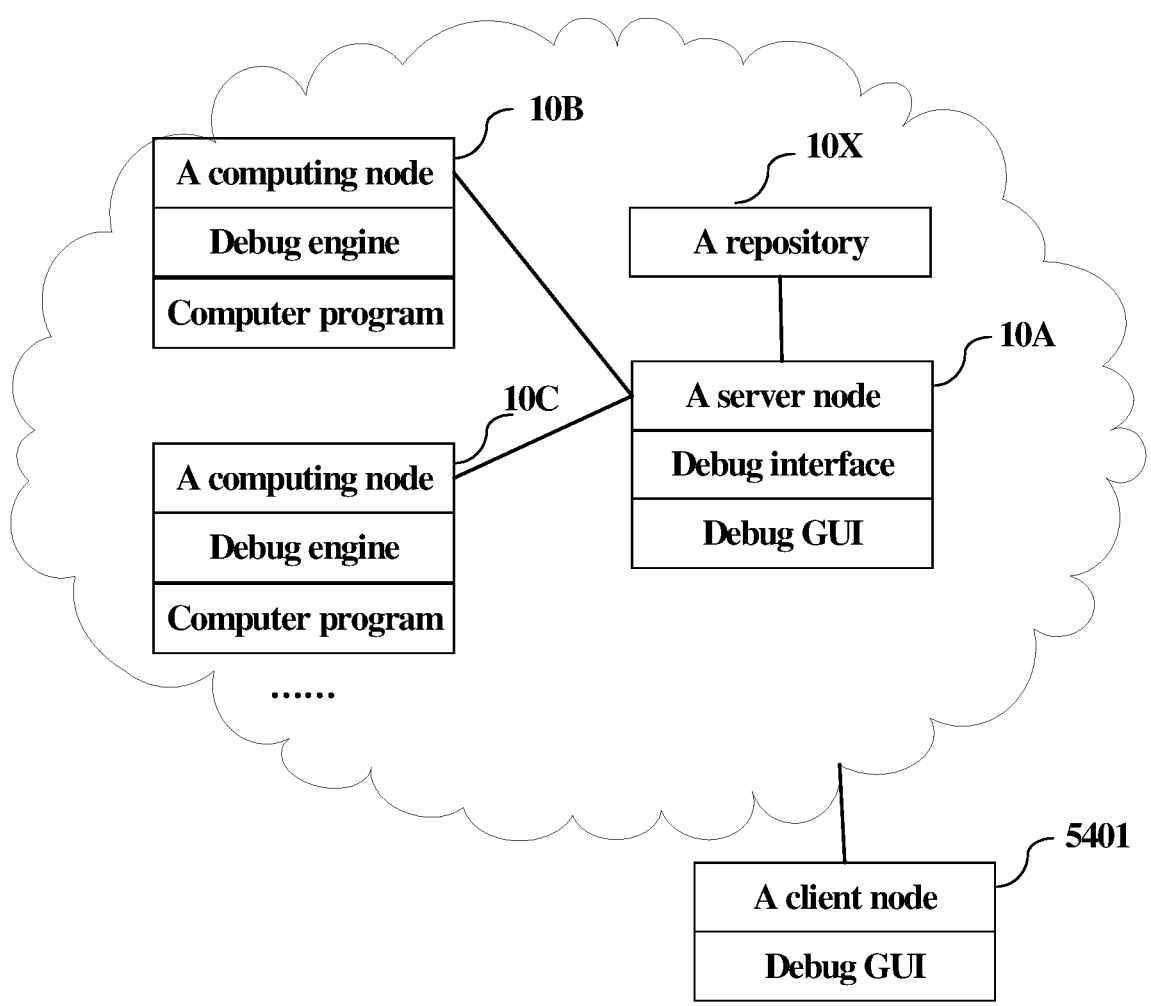
FIG. 10 depicts an example implementation according to an embodiment of the present invention in a cloud environment.

In a cloud computing environment, each component of the application might be distributed and deployed on many different computer nodes. However, such a distribution of application makes it very difficult to debug the application and determine problems. Debugging in a cloud computing environment includes a remote debugger controller connected to multiple nodes being debugged over the network, such as shown in FIG. 10. A remote debugger controller provides a GUI interface for creating and sending debugging commands to the multiple nodes being debugged, and for displaying results of debugging sessions. In current practice, the performance of the remote debugger controller may decrease as the number of nodes being debugged increases. This is due to overhead in displaying the disassembly codes and addresses, which contributes most of the performance pressure of the remote debugger controller GUI. In order to format the disassembly code for the disassembly views, application memory packages are passed from the multiple nodes being debugged to the remote debugger controller. Then, those memory packages are translated to disassembly code. The disassembly views are refreshed with those retrieved disassembly codes. Current practice focuses on pre-fetching. When breakpoints are set from the GUI, the memory package around the breakpoints are pre-fetched from the node being debugged. How many memory packages that will be pre-fetched depends on the algorithm being used. For example, memory packages can cover a function or a continuous area calculated by the algorithm. When a breakpoints is reached, the remote debugger controller GUI will search the pre-fetched disassembly code. However, the current practice has limitations. During debugging, if the user wants to set new breakpoints, new memory packages must immediately be fetched from the node being debugged. If the pre-fetched disassembly code includes branching instructions with target addresses outside of the current memory package, additional memory packages must be retrieved. Such "miss" cases may cause the remote debugger controller GUI to overload and hang.

The current practice of pre-fetching memory packages is inefficient in a large-scale cloud computing environment because it is a performance bottle-neck to refresh the GUI views. A breakpoint that is reached on multiple nodes being debugged may result in a memory package storm, as the memory packages are being passed to the remote debugger controller. All the memory packages from each node are required, and must be translated from machine code to disassembly code prior to displaying on the GUI. This can easily result in the GUI hanging due to overload.

In order to provide disassembly codes more efficiently during debugging, methods for disassembly code generation during debugging according to example embodiments of the present invention are provided, and will be described below.

Figure 4:
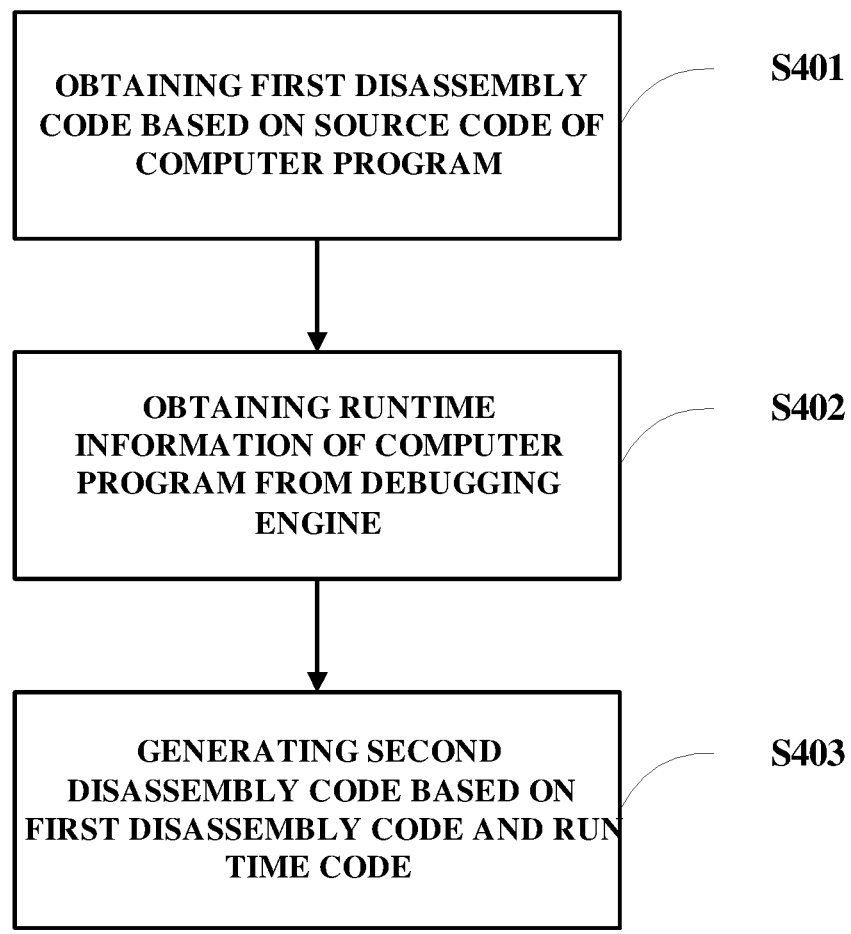
FIG. 4 depicts a flow chart according to an embodiment of the present invention.

FIG. 4 depicts a flow chart according to an embodiment of the present invention. As shown in FIG. 4, in step S401, a first disassembly code is obtained based on a source code of a computer program. The source code of the computer program is being debugged or to be debugged by a debugging engine. In step S402, runtime information of the computer program is obtained from a debugging engine. In step S403, a second disassembly code is generated based on the first disassembly code and the runtime information.

According to an embodiment of the present invention, the first disassembly code may be obtained in different phases, such as before and upon the user's request to view a disassembly code for the debugged computer program. For example, a base disassembly code may be obtained when the source code of the computer program is available to a debugging environment, even before the user's request to view the disassembly code. When the user requests to view a disassembly code during debugging, the runtime information of the computer program may be obtained from the debugging engine. And then the latest disassembly code may be generated based on the base disassembly code and current runtime information. Since most of the computing works for generating the disassembly code may be completed in advance, when the user requests a view of the disassembly code, the response time will be reduced greatly.

Figure 5:
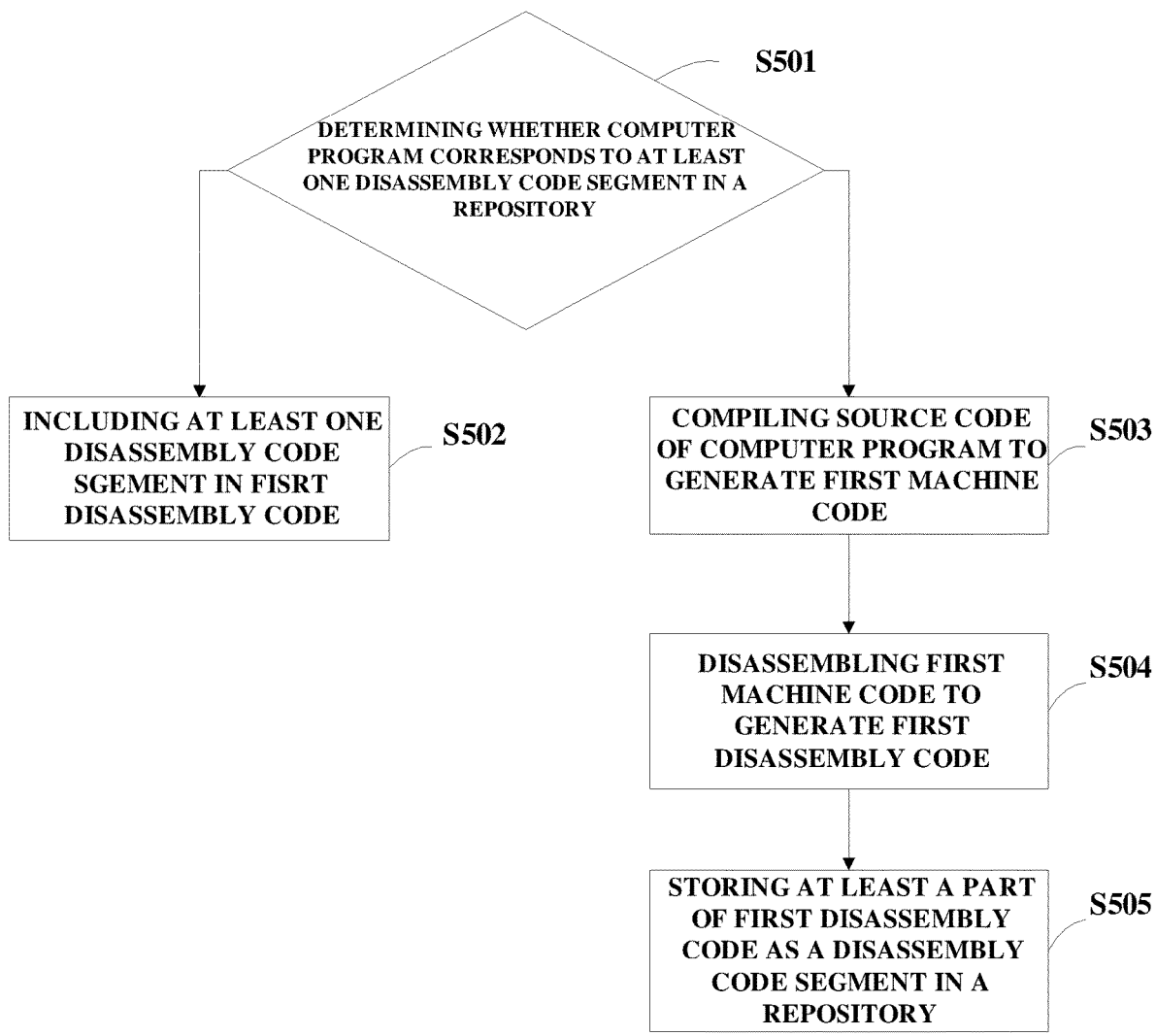
FIG. 5 depicts an example process for obtaining a disassembly code according to an embodiment of the present invention.

FIG. 5 depicts an example process for the step S401 in FIG. 4. According to an embodiment of the present invention, the first disassembly code may be obtained from a repository. As shown in FIG. 5, in step S501, it is determined whether the source code of the computer program corresponds to at least one disassembly code segment in a repository. If the result of the determining is true, the process goes to step S502. In step S502, the at least one disassembly code segment is included in the first disassembly code. The repository may store source codes and disassembly code segments mapping to the stored source codes. The result of the determining is obtained by comparing the source code of the computer program with the source codes stored in the repository. If at least a part of the source code of the computer program correspond to a source code stored in the repository, the result of the determining would be true.

The repository could be used to store disassembly code segments previously created. One of these disassembly code segments may correspond to the whole source code of the computer program, or just correspond to a part of the source code of the computer program, such as a function, or a library file. The repository may be a database accessible locally or remotely and may include searchable files and documents.

Further, in step S501, if there is no corresponding disassembly code segment in the repository, the process goes to step S503. In step S503, a first machine code is generated by compiling the source code of the computer program. The first machine code may be contained in an executable file, such as an ".exe" file. According to the strategy of the compiling tool, the process of generating the first machine code based on the source code of the computer program may include different steps. For example, some intermediate program, such as relocatable object file, may be generated, and a linker may be used to link a library file and the relocatable object file to obtain the first machine code.

Then, in step S504, the first machine code is disassembled to generate the first disassembly code. For example, the first disassembly code could be generated by using a disassembly tool, such as "objdump", to disassemble the executable file.

According to an embodiment of the present invention, step S503 and step S504 may also be implemented irrespective of step S501. Namely, for each debugging, without the usage of the repository, the first disassembly code is generated based on the source code, so as to avoid any unrecorded modification of the repository.

According to another embodiment of the present invention, the first disassembly code may be obtained by compiling the source code of the computer program to generate an assembly code. In this case, such assembly code may be used as the disassembly code for the computer program. The source code may be created with any type of high-level programming language, such as C, C++. A compiling tool may compile the source code of the computer program to generate a "lst" file with "assembly listing", which includes the first disassembly code.

In step S505, at least a part of the first disassembly code is stored as a disassembly code segment in the repository. The repository may be updated during each debugging. The debugging experience may be retained, so as to improve the efficiency of the future work.

The usage of the repository may greatly reduce the calculation cost of generating the first disassembly code, especially when source code segments of common functions are used in different computer program. Further, the storage of the first disassembly code may be especially useful in a cloud environment shown in FIGS. 2 and 3. In the cloud environment, due to scaling, high availability and other reasons, it is very common that the first machine code of the computer program is sent to a plurality of computing nodes 10 to execute. These computing nodes share the same first disassembly code, which is generated by disassembling the first machine code and may be called as a base disassembly code. During the respective debugging of the computer program running on the plurality of computing nodes, the second disassembly code for different computing nodes will be different with the first disassembly code, and the differences are only in the runtime information. Therefore, by using the runtime information from the debugging engine, repeated compiling or disassembling work may be avoided, thus the debugging efficiency may be further improved in a cloud environment.

According to an embodiment of the present invention, the runtime information may include relocation information. The executable file including the first machine code may be loaded to a computer memory by a loader, and the relocation information may be obtained from the loader. As discussed above, the first machine code may be obtained by compiling the source code of the computer program.

Based on the relocation information and the base disassembly code, the updated disassembly code may be generated and provided to the user.

Figure 6:
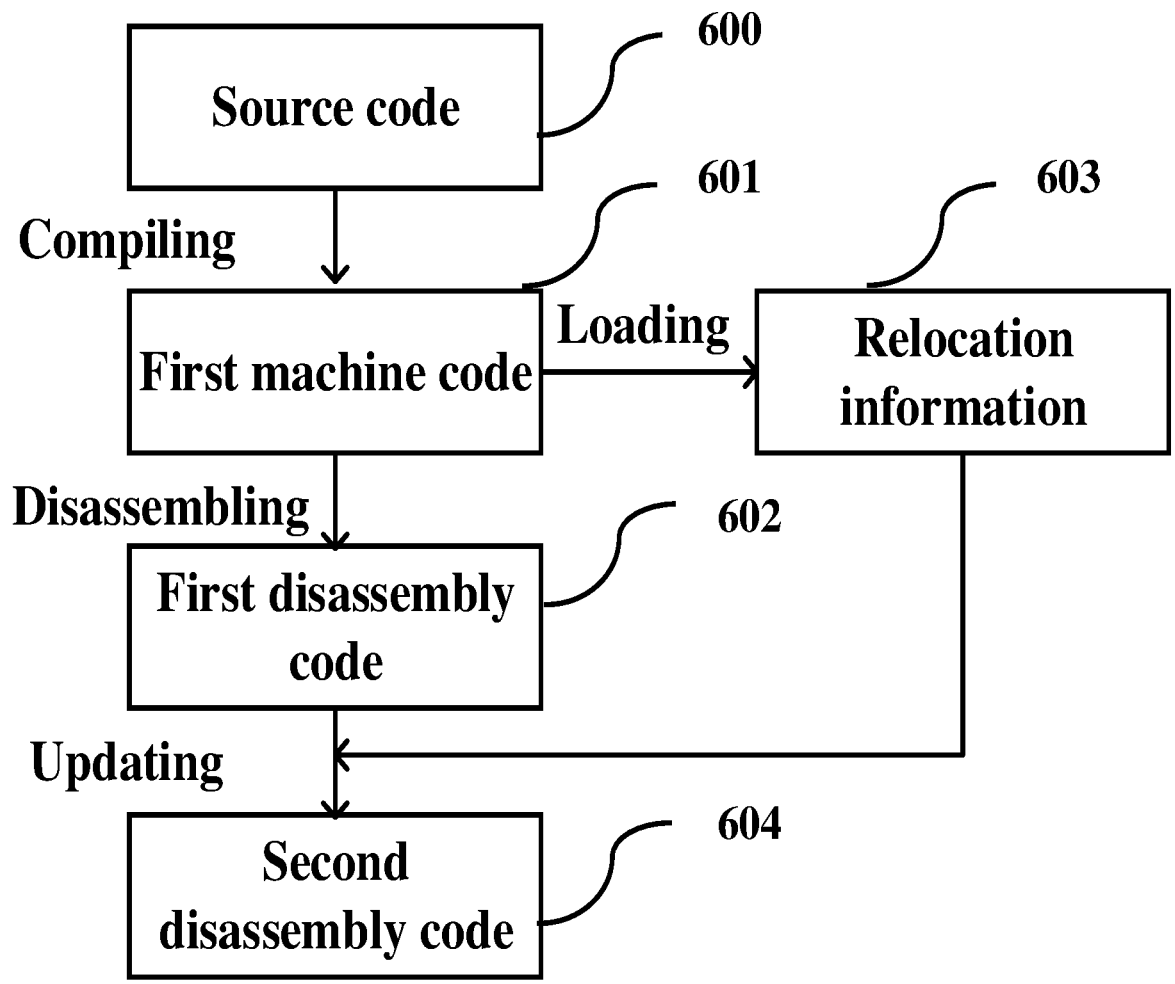
FIG. 6 depicts an example relationship between different codes of the computer program according to an embodiment of the present invention.

With reference now to FIG. 6, an example relationship between different codes of the computer program is shown. The source code 600 of the computer program is compiled into the first machine code 601. The first machine code 601 is disassembled into the first disassembly code 602. The first machine code 601 is loaded by a loader to generate the relocation information 603. Then, the first disassembly code 602 is updated with the relocation information 603 and the second disassembly code 604 is generated. Please note that the actions of compiling, disassembling, loading, updating may be implemented in the same computing node or different computing nodes.

Figure 7:
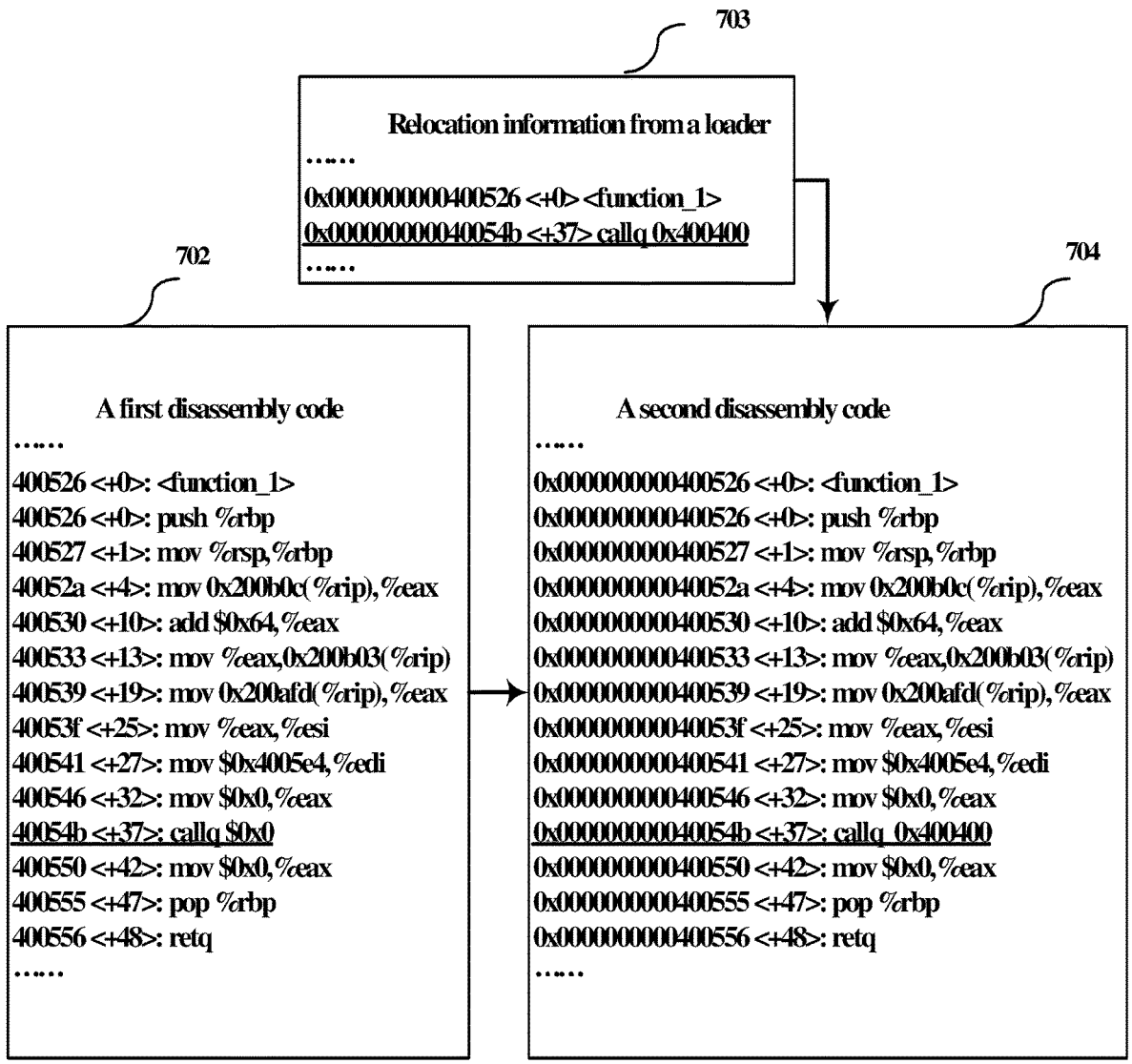
FIG. 7 depicts examples of relocation information, first disassembly code and second disassembly code according to an embodiment of the present invention.

FIG. 7 depicts example relocation information, first disassembly code and second disassembly code according to an embodiment of the present invention. With reference now to FIG. 7, in the underlined code line in the first disassembly code 702 "40054b<+37>: callq $0x0", an entry for a function may have an address value "0x0", and configured to be relocatable. Namely, when the executable file corresponding to the first disassembly code 702 is loaded by the loader, this address value needs to be updated to an active address value for calling this function. The relocation information 703 shows the active address value for calling this function. As shown by the underlined code lines in FIG. 7, the entry for this function is updated from "0x0" in the first disassembly code 702 to "0x400400" in the second disassembly code 704. It means that the entry point of the function would be stored in a memory space corresponding to "0x400400" after this loading. During loading, the debugging engine may record address information of instructions or data of the computer program loaded in the computer memory.

Figure 8:
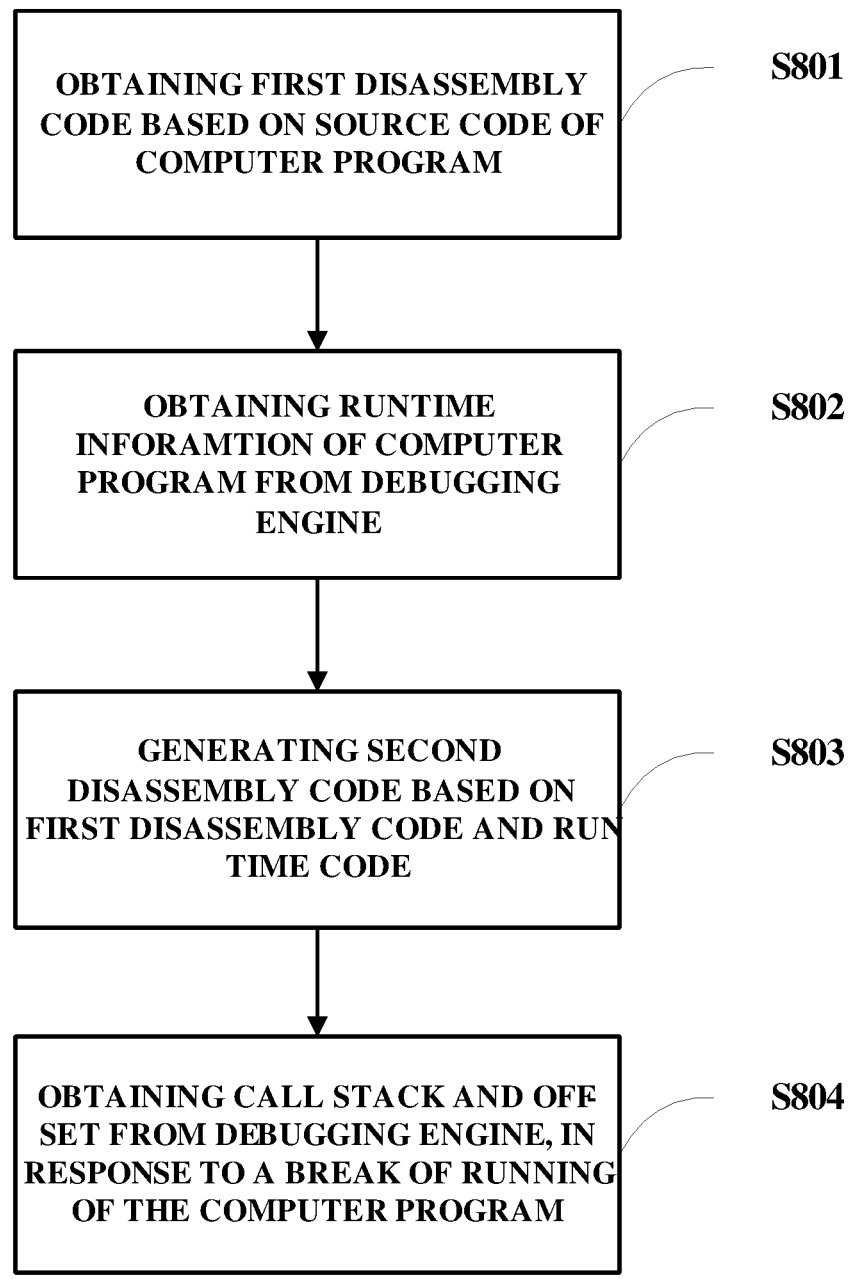
FIG. 8 depicts a flow chart according to another embodiment of the present invention.

FIG. 8 depicts a flow chart according to another embodiment of the present invention. The steps S801, S802 and S803 are same with the steps S401, S402 and S403 shown in FIG. 4 and the description for those steps are omitted here for the sake of simplicity. With reference to FIG. 8, the method for disassembly code generation during debugging further includes step S804, in which a call stack and an off-set are obtained from a debugging engine in response to a break of running of the computer program. The call stack indicates the calling sequence of the functions of the computer program. When the computer program runs, an off-set may be added to a base memory address to get an active memory address for an instruction or a data to be accessed. During debugging, the user may want to know the position of a current running instruction in the second disassembly code. Thus, the off-set may be used to indicate the position of a current running instruction in the second disassembly code.

Figure 9:
FIG. 9 depicts examples of a second disassembly code and a call stack according to an embodiment of the present invention.

With reference now to FIG. 9, a second disassembly code 704 and a call stack 901 after the break are illustrated. The second disassembly code 704 includes a position of the current instruction. The current instruction is indicated by an arrow to the second disassembly code 704 as shown in FIG. 9. The call stack 901 shows that the current instruction is in a function of "function_1", which is called by a function of "function_2".

According to an embodiment of the present invention, the break of running may be caused by reaching a breakpoint. The breakpoint may be configured with any condition, such as a specific position of the instruction, a value of a variable, or a logic expression.

The breakpoint may be set up before the computer program runs. When the breakpoint is reached, the second disassembly code may be updated. For the updating, only very few debug information, such as the call stack, and the off-set would be updated to indicate the current state. Thus, it needs very few data transmission or calculation to display the updated disassembly code to the user. With this advantage, a new breakpoint may be arbitrarily set during debugging, and the user can get the updated disassembly code with almost no latency. The work efficiency may be improved.

The method for disassembly code generation during debugging may be applicable in any computer system, such as a single personal computer or a client/server system. Particularly, this method is applicable in a cloud environment, to greatly improve the work efficiency.

According to an embodiment of the present invention, the second disassembly code may be generated in a first computer node, and the first machine code of the computer program may be loaded in a second computer node. The first computer node and the second computer node communicate with each other. FIG. 10 depicts an example implementation according to an embodiment of the present invention in a cloud environment. As an example of a cloud environment, the first computer node may be a server node 10A, and the second computer node may be one of a plurality of computing nodes 10B, 10C, etc.

The first machine code may be sent to a plurality of computing nodes 10B, 10C . . . as shown in FIG. 10. The user may use a server node 10A to debug the computer program running on the plurality of the computing nodes 10B, 10C . . . simultaneously. The computing nodes 10B, 10C . . . have debugging engines supporting the debugging of the computer program. The server node 10A uses the same first disassembly code as a basis for the plurality of the computing nodes 10B, 10C . . . . No disassembling work need to be done in any of the plurality of the computing nodes 10B, 10C . . . in runtime. Then, very few information would be transmitted from the plurality of the computing nodes 10B, 10C . . . to the server node 10A during debugging. Thus, the work efficiency may be improved greatly.

Due to such structure, debug as a service (DAAS) is easily provided in a cloud environment. A debugging interface provided for the DAAS may be used by a debugger GUI. The user may operate the server node directly, or through a client node 5401 served by the cloud environment. Further, the repository 10X may be allocated in the server node 10A. Or, the repository 10X may be provided in a specified storage node.

The method according to embodiments of the present invention may be applied to all kinds of GUI debugger, like Visual Studio, Eclipse, iDebugger, QNX Tool Suite, CCS, etc.

In embodiments of the present invention, disassembly code is fetched from each of the nodes being debugged by a remote client, such as client node 5401. The executable module/file corresponding to the running node being debugged is compared to the fetched disassembly code. Both contain the disassembly codes of a function or a symbol. However, there may be an address difference between the executable module/file and the running node being debugged due to relocation done by the loader of operation system.

Using the relocation information provides by the loader when the node being debugged was loaded into memory, it can be determined which instructions in the disassembly codes base (repository) are not the same as the instructions in the memory of the node being debugged. Using relocation information provided by the loader, the disassembly codes in the repository are modified to give them the same address as the instructions in the memory of the node being debugged. The set of instructions to be modified are stored separately with the disassembly codes base and are named as modified disassembly codes. Each memory instance in each running node being debugged has a corresponding set of modified disassembly codes in the repository.

The disassembly codes base (repository) may be stored locally with the GUI or on some other node. The GUI may retrieve the modified disassembly codes at run-time. The modified disassembly codes are used to overwrite the corresponding disassembly codes base from the repository, which then are displayed in the GUI.

This process avoids the current practice of having to retrieve memory packages from each node being debugged, and eliminates having to translate the retrieved memory to disassembly codes each time the GUI view is refreshed, such as when stepping through code or setting additional breakpoints. Additionally, in a cloud computing environment, usually, the nodes have loaded the same executable module/file. Therefore, the nodes can share one disassembly codes base without need to get memory packages for each node being debugged.

The disassembly codes base is created in an initiation/preparation phase. The disassembly codes base includes symbol/function names and their corresponding disassembly codes. Any debugging/disassembler tools can export symbol/function names. The remote debugger controller will store the information into the disassembly codes base repository.

The modified disassembly codes are created when a remote debugger agent is attached on the node to be debugged. The loader of the operating system loads the executable code into memory. The remote debugger agent receives address information about the executable being debugged, including the base address of each address space being debugged. There may be more than one address space in each node, in which case, there is an instance of the remote debugger agent for each address space. The remote debugger agent receives the base address of the executable file being debugged, as well as its entry point. Each remote debugger agent passes the address information back to the remote debugger controller. The remote debugger controller modifies the instructions of the corresponding disassembly codes base to create modified disassembly codes for each node being debugged. The modified disassembly codes are stored in a runtime repository. The runtime repository may be separate from the disassembly codes base repository or may be combined.

When a client sets a breakpoint on the GUI, the GUI translates the operations to debug commands on the remote debugger agent. When the breakpoint is reached, the remote debugger agent sends to the remote debugger controller information sufficient to debug the execution environment at the breakpoint. The information includes the call stack and contents of variables. The GUI retrieves the modified disassembly codes and the disassembly codes base corresponding to the breakpoint from the repository. The remote debugger controller overwrites the disassembly codes base using the modified disassembly codes, and then displays the modified breakpoint information on the GUI, including stack trace information and absolute addresses. Additional breakpoints may be set at this point, using information contained in the disassembly codes base and runtime repository without requiring the retrieval of memory packages from the nodes being debugged.

According to embodiments of the present invention, a computer system of the present invention comprises one or more processors, one or more memories, and one or more computer readable hardware storage devices, said one or more hardware storage device containing program code executable by the one or more processors via the one or more memories to implement the methods of the present invention.

According to embodiments of the present invention, a computer program product of the present invention comprises one or more computer readable hardware storage devices having computer readable program code stored therein, said program code executable by one or more processors of a computer system to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining, by one or more processing units, a first disassembly code based on a source code of a computer program;
    obtaining, by one or more processing units, runtime information of the computer program from a debugging engine, wherein the runtime information of the computer program includes relocation information obtained from a loader that loads a first machine code of the computer program to a computer memory, and wherein the first machine code of the computer program is obtained by compiling the source code of the computer program; and
    generating, by one or more processing units, a second disassembly code based on the first disassembly code and the runtime information of the computer program by updating the first disassembly code with the relocation information obtained from the loader.

2. The computer-implemented method of claim 1, wherein obtaining, by one or more processing units, a first disassembly code based on a source code of a computer program comprises:
 determining, by one or more processing units, at least one disassembly code segment in a repository, wherein the at least one disassembly code segment corresponds to the source code of the computer program; and
 in response to determining that the at least one disassembly code segment is in the repository, including, by one or more processing units, the at least one disassembly code segment in the first disassembly code.

3. The computer-implemented method of claim 1, wherein the first disassembly code is generated by:
 compiling, by one or more processing units, the source code of the computer program to generate a first machine code; and
 disassembling, by one or more processing units, the first machine code to generate the first disassembly code.

4. The computer-implemented method of claim 3, further comprising:
 storing, by one or more processing units, at least a part of the first disassembly code as a disassembly code segment in a repository.

5. The computer-implemented method of claim 1, further comprising:
 in response to a break of running of the computer program, obtaining, by one or more processing units, a call stack and an off-set from the debugging engine, wherein the off-set indicates a position of a current running instruction in the second disassembly code.

6. The computer-implemented method of claim 5, wherein the break of running of the computer program is caused by reaching a breakpoint.

7. The computer-implemented method of claim 1, wherein the second disassembly code are generated in a first computer node, and the computer program runs in a second computer node during debugging, and wherein the first computer node and the second computer node communicate with each other.

8. The computer-implemented method of claim 1, further comprising:
 displaying, by one or more processing units, the second disassembly code to a user.

9. A system comprising:
 one or more processors;
 a memory coupled to at least one of the one or more processors; and
 a set of computer program instructions stored in the memory and executed by at least one of the one or more processors in order to perform actions of:
  obtaining a first disassembly code based on a source code of a computer program;
  obtaining runtime information of the computer program from a debugging engine, wherein the runtime information of the computer program includes relocation information obtained from a loader that loads a first machine code of the computer program to a computer memory, and wherein the first machine code of the computer program is obtained by compiling the source code of the computer program; and
  generating a second disassembly code based on the first disassembly code and the runtime information of the computer program by updating the first disassembly code with the relocation information obtained from the loader.

10. The system of claim 9, wherein the action of obtaining a first disassembly code based on a source code of a computer program comprises:
 determining at least one disassembly code segment in a repository, wherein the at least one disassembly code segment corresponds to the source code of the computer program; and
 in response to determining that the at least one disassembly code segment is in the repository, including the at least one disassembly code segment in the first disassembly code.

11. The system of claim 9, wherein the first disassembly code is generated by:
 compiling the source code of the computer program to generate a first machine code; and
 disassembling the first machine code to generate the first disassembly code.

12. The system of claim 11, wherein the actions further comprise:
 storing at least a part of the first disassembly code as a disassembly code segment in a repository.

13. A computer program product comprising a computer readable storage medium having program instructions embodied therewith, wherein the computer readable storage medium is not a transitory signal per se, and wherein the program instructions are executable to perform a method comprising:
 obtaining a first disassembly code based on a source code of a computer program;
 obtaining runtime information of the computer program from a debugging engine, wherein the runtime information of the computer program includes relocation information obtained from a loader that loads a first machine code of the computer program to a computer memory, and wherein the first machine code of the computer program is obtained by compiling the source code of the computer program; and
 generating a second disassembly code based on the first disassembly code and the runtime information of the computer program by updating the first disassembly code with the relocation information obtained from the loader.

14. The computer program product of claim 13, wherein obtaining a first disassembly code based on a source code of a computer program comprises:
 determining at least one disassembly code segment in a repository, wherein the at least one disassembly code segment corresponds to the source code of the computer program; and
 in response to determining that the at least one disassembly code segment is in the repository, including the at least one disassembly code segment in the first disassembly code.

15. The computer program product of claim 13, wherein the first disassembly code is generated by:
 compiling the source code of the computer program to generate a first machine code; and
 disassembling the first machine code to generate the first disassembly code.

16. The computer program product of claim 15, wherein the method further comprises:
 storing at least a part of the first disassembly code as a disassembly code segment in a repository.

17. The computer program product of claim 13, wherein the method further comprises:
 in response to a break of running of the computer program, obtaining a call stack and an off-set from the debugging engine, wherein the off-set indicates a position of a current running instruction in the second disassembly code.

* * * * *